Patented Mar. 16, 1937

2,074,013

UNITED STATES PATENT OFFICE 2,074,013

PROCESS OF TREATING ORES AND SIMILAR MATERIALS

Wilson Bradley, deceased, late of Deerwood, Minn., by Agnes Cornelison Bradley, executrix, Duluth, Minn., assignor to Bradley Process Corporation, Wilmington, Del., a corporation of Delaware No Drawing. Application June 1, 1936, Serial No. 82,936

13 Claims. (Cl. 75—1)

The present invention relates generally to improvements in the heat-treatment of mineral substance containing mixed iron and manganese values. It has special reference to ores containing manganese values in order to convert manganese values into a manganous oxide form for a subsequent leaching operation which dissolves manganous oxide from other matter. And it has reference to special treatments of iron ores.

The general subject matter has been heretofore presented in applicant's prior Patent No. 1,937,508 of December 5, 1933. In that patent there is described a process of treating mixtures of iron values and manganese values leachable as manganous oxide, when a solution of a salt like ammonium sulphate is used, and to render the iron values largely insoluble in the leaching solution. The process consists of heating the values in a reducing atmosphere in the presence of water vapor. Any suitable reducing agent or combination of reducing agents may be employed, such for example as carbon monoxide, produced by the incomplete combustion of illuminating gas in the reduction furnace. This is a gas containing hydrogen as such, or in combination, or both. By this method it will be observed that a quantity of water vapor is present during the reduction, which may have some marked effect upon the physical and chemical form, stability and solubility of the constituents of the roasted and reduced ore. When water vapor is so formed, or in case none is so formed, steam may be introduced to secure the effect of water vapor or to amplify the effect of that created by combustion.

An important function attributed to the presence of water vapor is the action in the furnace of the iron values. The said patent discloses that in the reducing furnace the iron values are rendered largely magnetic, which indicates a special oxide form, which form is not readily soluble in the ammonium sulphate leaching process. The magnetic form is recognized as intermediate between $Fe_2O_3$, the oxide of most iron ores, and the chemically reduced form FeO. Thus the mixed iron and manganese values can be treated in a furnace to effect their separation by leaching.

The said patent teaches that this effect takes place at under about 500° C., and that above this temperature the process renders the resulting iron values non-magnetic and soluble in the ammonium sulphate, and hence the two values cannot be so well separated nor so highly concentrated. Said patent sets forth 500° C. as an upper limit for the reducing furnace operations on such mixed values.

The present invention is based upon additional discovery with reference to such process. It shows that mixed iron and manganese values can be so processed above 500° C. with the same advantage. It is not to be understood that this new discovery in any way contradicts or limits what is taught in said earlier patent. It merely adds to the knowledge of it, and states an additional factor, which when observed, permits the temperature limit to be higher than 500° C., originally claimed.

When the development leading to the said patent was carried out, it was a practice to treat the mixed iron and manganese values so that the manganese values were almost completely, or very efficiently, converted into manganous oxide, since that was the objective of the research. Repeated work at various temperatures showed that at temperatures over about 500° C. the iron values became solubilized for the leaching liquor, and that below that temperature they readily resisted solution, and were discharged as tails capable of magnetic concentration. However, all these findings were based on the condition that substantially all of the higher manganese oxides were reduced at the end of the reduction process. Then applicant discovered that if there was a substantial amount of higher manganese oxide present at the end of the reduction, the iron values which were discharged from furnacing temperatures above 500° C., were the same in character as when the temperature was below 500° C. Applicant thus discovered that the presence of a quantity of manganic oxide in the furnace charge protected the iron values from the solubilizing effect of the process at temperatures above 500° C.

Applicant then discovered that where a readily leachable manganous oxide was desired, it was necessary to limit the temperature of reduction to not over about 850° C., for the reason that higher heat renders the manganous oxide more refractory or resistant to the leaching effect of the ammonium salt.

Accordingly it is an object of the present invention to treat iron values in the presence of higher manganese oxide values to a reducing heat treatment in the presence of water vapor at temperatures not under about 500° C., in order to secure iron values which are magnetic, which type of oxide of iron is not readily subject to leaching in an ammonium salt solution.

It is still another object of the invention to treat mixed iron values and manganese values to a reducing action in the presence of water vapor and of higher manganese oxide at temperatures from about 500° C. to about 850° C. in order to form a mixture containing manganous oxide which is readily leachable by an ammonium salt, and iron values which are not readily leachable, and which are magnetic, whereby manganese values may be concentrated in a leaching solution, and iron values be concentrated in tailings, and be subject to magnetic concentration from said tailings.

It is still another object of the invention to have present a higher oxide of manganese at all times when a temperature over about 500° C. prevails in a reducing treatment to form magnetic iron values.

Other and ancillary objects and advantages of the invention will become apparent from the following description and explanation of the invention and of the processes which may depend upon it.

In further discussion of one phase of the invention it is explained why it may be necessary or desirable to exceed the limit of 500° C. set forth in the said Patent No. 1,937,508. There are some manganese minerals which cannot be broken down at lower temperatures, so as to release or form leachable manganous oxide. They need exposure to temperatures above 500° C. Braunite is an example. This is a manganous oxide silicate. It does not need reduction to form MnO, but under high heat, such as 750° C. to 900° C., it is broken up to render the manganous values available for leaching. A reducing atmosphere is preferred for such treatment to assure that manganous oxide is discharged. Higher temperatures may be used. However, it has been determined that an upper temperature limit of about 1550° F. (850° C.) may be observed. Manganous oxide formed below this limit, and cooled in a non-oxidizing atmosphere, is less stable, more reactive and more readily leached than that formed above this temperature.

So it follows that where temperatures above 500° C. are used for any reason, when leachable manganous oxide is desired, and substantially non-leachable iron values, the process is carried on in the presence of a higher manganese oxide and at a temperature under about 850° C. Where large amounts of manganic values are present initially, only a part of this is reduced, so as to leave an effective quantity of higher manganese oxide to protect the iron values from the solubilizing effect of the temperatures over 500° C.

The process is most useful for ores which are low grade in regard to both manganese and iron values, but this is no limitation to the use of the process.

As an example of the process, a low grade Minnesota ore is chosen to illustrate one manner in which the same may be carried out. There is such an ore analyzing in part as follows:

Manganese _____ 19.32%
Iron _____ 24.34%
Silica _____ 25.07%
Calcium _____ Trace and containing silica, hematite, limonite, magnetite, psilomelane, and pyrolusite. The iron content of the mineral comprises 50% hematite and 20% limonite, the remainder being magnetite and psilomelane.

In using this ore the practice of the prior Patent No. 1,937,508 may be practiced, using the temperatures below 500° C. Thus, it is possible to reduce substantially all of the manganic content to manganous oxide. But where the temperature is higher, or must be higher, as for example where some such mineral as Braunite is present or is added, the process must be carried out according to this invention, having present some effective quantity of higher manganese oxide. This may be added from time to time, as reduction proceeds, or the reduction of manganic content of the original charge is left incomplete, so that an effective quantity of manganic oxide remains present throughout the process to protect the iron values, when the temperature is over about 500° C.

When using a combustible gas as a reducing agent, for example one containing carbon monoxide and hydrogen, air may be admitted with the gas for burning a portion of the gas to supply the necessary heat. The resultant water vapor acts beneficially to render iron values less soluble, so that they remain in the tails, and also advantageously to render the iron values magnetic in character so that they may be separated from the tails by magnetic concentration. The beneficial effects may be increased by adding steam in addition to the air or by adding steam alone to the reducing gas that is employed.

In practice the raw material is crushed to about 4-mesh. Then it is fed into one end of a chamber, such as a Herschoff furnace, against a current of reducing gas introduced at the discharge end. Illuminating gas analyzing as follows has been employed.

|  | Percent |
|---|---|
| Carbon dioxide | 3.1 |
| Illuminants | 9.7 |
| Oxygen | 1.7 |
| Carbon monoxide | 21.5 |
| Methane | 24.0 |
| Hydrogen | 32.0 |
| Nitrogen | 8.0 |

(589 B. t. u. per cubic foot)

Sufficient air is admitted, with steam, to effect the desired temperature.

By having present a quantity of manganic oxide, the reduction is made selective. As between the manganic oxide and non-magnetic iron values, it does not appear important to the present invention, which has the selective action for the reducing agent. Apparently the manganous oxide and the non-leachable magnetic iron values can be formed together, but when there is manganic oxide present the manganic oxide protects the magnetic form from that change, which is known to take place above 500° C. if manganic oxide is absent. The reduction therefore is termed a selective one.

It has been determined that with the ore above described and at temperatures between about 500° C. and about 850° C., there is a selective reduction of manganese values to readily leachable manganous oxide values (MnO) before the iron values are reduced below the magnetic form ($Fe_3O_4$), and but small quantities of soluble iron will be formed in the furnace while there are unreduced manganese values. After a substantial portion, say 85% to 90%, of the higher oxides of the manganese are reduced to manganous oxide, then there will be a gradual increase in the soluble iron content as the manganese reduction nears completion. While there are substantial quantities of the higher unreduced manganese oxides in the furnace, the effect of temperature on the formation of soluble iron is negligible, but as the unreduced manganese values decrease the effect of temperature on the formation of soluble iron is marked.

After the reducing heat-treatment, where the product is to be leached immediately, the furnace product is cooled in a reducing atmosphere, using preferably the same reducing gas that is used in the furnace. Cooling or quenching may be practiced, but cooling is preferred as it appears to render the ore more adaptable for the leaching operation. If quenching is practiced, water or a strong or dilute solution of the leaching agent may be employed.

The product, either as cooled or as quenched, may be treated with a leaching solution such as a solution of an ammonium salt, of which the sulphate is preferred. Various modifications of this leaching process are set forth in the Laury Patent No. 1,932,413 and in applicant's Patent No. 1,937,508 and others. Such leaching solutions readily dissolve the manganous oxide forming material such as manganous sulphate and also forming free ammonia in solution, which is kept low in content to retain the leaching power for manganous oxide. The magnetic oxide of iron readily resists solution in the leaching agent, and is left in the tails, wherefrom it may be removed by magnetic concentration. The Minnesota ore above described can be made to yield by suitable reduction and extraction as above described or referred to, a magnetic concentrate which comprises 77% to 83% of the tailings, and which contains 93% to 95% of the iron present in the tailings. The percentage of manganese values recovered may vary with the desired economies of operation, but that which remains in the tails need not be considered as lost when it is recycled through the reducing process.

Since the tails of the leaching process under this invention contain manganese values and magnetic iron values, it is to be understood that the reduction process may be practiced without use of the leaching process, where it is an object to concentrate iron values and to separate them from the manganese values.

Furthermore, since the present invention is based upon the use of higher manganese oxide to protect the magnetic forms of iron oxide from change by the reducing action which takes place in the presence of water vapor at over about 500° C., it follows that the present invention may be used in conjunction with the invention set forth in said Patent No. 1,937,508. The present invention may be a preliminary step in the reduction process. In other words, in so reducing iron values, or mixed iron values and manganic values, the temperature of the reduction may go higher than 500° C. so long as higher manganese oxide remains to protect the iron values. However, when the manganic oxide begins to disappear, the temperature must be lowered to a point below 500° C. Thus the iron values are protected first by the presence of the manganic values, and later by the absence of high temperature. By so combining the present invention with that set forth in Patent No. 1,937,508, the iron values may be retained largely in the magnetic form, and the manganese values may be substantially all reduced. Such a reduced product may be treated in several ways to win iron values and manganese values.

One way is to remove magnetic iron values directly by magnetic separation. The tails from this may be treated to remove manganous oxide from other ingredients by one of several leaching actions. Ammonium salt may be used, or else an extraction with acid, such as nitric acid. In such use of acid, it is desirable to remove the iron first because the acid is likely to dissolve iron oxides as well as manganous oxide.

Another way to treat the furnace product is to subject it to the leaching with an ammonium salt solution as described above, and then to separate magnetic iron values from the tails of the leaching process. Where the ammonium salt extraction process is used to remove manganous oxide, the temperature of the reduction should not go over about 850° C., because the manganous oxide then becomes more resistant to such leaching agent.

The prior Patent No. 1,937,508 describes the leaching process as a two-stage process, using partially spent leach liquor on freshly reduced ore, and fresh or regenerated black liquor in the tails of the first stage. It has been found that this process is particularly advantageous where the furnace discharge contains higher oxides of manganese as produced by use of the present invention. The leaching in the first stage becomes more selective. Less iron is contained in the clear liquor containing the manganese sulphate. When the first stage of digestion with fresh ore and partially spent leach liquor is stopped before all the manganous oxide is dissolved, it is found that little iron has been dissolved from the ore. This iron as tails enters the second digestion step wherein the extraction of manganese values is completed with fresh or regenerated leach liquor. This leach liquor will dissolve some iron along with the manganese, and the resulting solution enters the first digester. Consequently the first step of the double leaching process is a selective leaching of manganous oxide from iron values capable of being leached.

The probable explanation of this advantage is the action of the higher oxide of manganese on the reduced or soluble iron values. The furnace charge may contain a small quantity of such soluble iron values. The partially spent leach liquor may contain some dissolved or precipitated iron values as ferrous salts. The action of the leaching renders the mass alkaline with ammonia. Under these conditions an oxidizing agent readily oxidizes ferrous iron to ferric iron, which is less soluble. Hence, the residual higher oxide of manganese may so supply oxygen to clarify the product. Therefore, the furnace product is useful in the first stage of such a digestion, and useful as a reagent to clarify the extract of the second stage of digestion.

Therefore, the present invention is to be considered as an improvement in reducing treatments of iron values, or mixed iron and manganese values where the temperature of reduction is or must be higher than about 500° C., and where the desired product is a magnetic form of iron.

What is claimed is:

1. The method of treating an ore-like material containing iron and manganese values which comprises subjecting the material to the action of a heated reducing gas and water vapor at a temperature suitable for reducing action and not under approximately 500° C. and not over about 850° C. until a major part of the manganese value is converted into manganous oxide and a minor part is retained in unreduced form whereby a major part of the iron value is converted into a magnetic iron oxide which is relatively insoluble in an ammonium salt solution under conditions of free ammonia content which readily permits dissolution of the manganous oxide.

2. The method of treating ore-like materials containing manganese and iron values which comprises subjecting the material to the action of a reducing gas and water vapor at a reducing temperature which is not under approximately 500° C. and not over about 850° C., until a major part of the manganese values is converted to manganous oxide and a major part of the iron values is converted to magnetic oxide, and stopping the action before reduction of all the manganese values to manganous oxide, whereby to prevent converting magnetic iron values into a lower oxide form.

3. The method of treating material containing manganese and iron values which comprises subjecting the material to the action of a reducing gas and water vapor at a reducing temperature which is not under approximately 500° C. and not over about 850° C., until an incomplete reduction is attained yielding iron values in the form of magnetic oxide, and manganese values in major part as manganous oxide, and in minor part in oxide form higher than the manganous oxide, and leaching out part of the manganous oxide with an ammonium salt solution whereby to recover a manganous salt solution of low iron content.

4. The method of concentrating iron and manganese values from material containing manganic oxide compounds and iron compounds which comprises subjecting the material to the action of a reducing agent and water vapor at an elevated temperature suitable for reducing action above approximately 500° C. and under approximately 850° C. until a portion of the manganic oxides are reduced to manganous oxide and iron compounds are converted to a magnetic oxide form of iron, leaving an unreduced protective quantity of manganic oxide which is effective above about 500° C. to prevent reduction of iron compounds to a form which is readily soluble in an ammonium salt solution, and treating the resulting product with an ammonium salt solution to dissolve manganous oxide from the material and yield magnetic tails of iron compounds.

5. The method of forming magnetic iron oxide values suitable for concentration by magnetic means, which comprises subjecting material containing the higher oxides of iron to the action of a reducing gas and water vapor at temperatures above about 500° C. in the presence throughout the treatment of oxides of manganese higher than manganous oxide, whereby the higher oxides of manganese protect the magnetic oxide of iron from reduction to the non-magnetic oxide form.

6. The method of treating material containing the higher oxides of manganese and the higher oxides of iron, so as to render manganese values and iron values subject to selective separation, which comprises first subjecting the material to the incomplete reaction with a reducing agent within the temperature limits of from about 500° C. to about 850° C., removing the material from reducing influence of temperature over about 500° C., and then continuing the reducing action at a temperature below about 500° C.

7. In the process of reducing higher oxides of iron to magnetic oxide values in the presence of water vapor, the step of maintaining a higher oxide of manganese in the iron values at all times when the temperature of the reduction process is over about 500° C.

8. In the process of reducing higher oxides of iron to magnetic oxide values in the presence of water vapor, the steps of maintaining a higher oxide of manganese in the iron values at all times when the temperature of the reduction process is over about 500° C., and then continuing the reduction at a temperature below about 500° C. whereby to reduce said higher manganese oxide to manganous oxide.

9. In the process of reducing higher oxides of iron to magnetic oxide values in the presence of water vapor, the steps of maintaining a higher oxide of manganese in the iron values at all times when the temperature of the reduction process is over about 500° C., and then continuing the reduction at a temperature below about 500° C. until substantially all the higher manganese oxide is reduced to manganous oxide.

10. In the process of reducing higher oxides of iron to magnetic oxide values in the presence of water vapor, the steps of maintaining a higher oxide of manganese in the iron values at all times when the temperature of the reduction process is between about 500° C. and about 850° C., whereby the said manganese oxide protects the magnetic iron values from change by temperature over 500° C., and whereby resultant manganous oxide is protected from being rendered resistant to leachability in an ammonium salt solution by the effect of temperature over about 850° C.

11. In the process of reducing higher oxides of iron to magnetic oxide values in the presence of water vapor, the steps of maintaining a higher oxide of manganese in the iron values at all times when the temperature of the reduction process is between about 500° C. and about 850° C., and then continuing the reducing action at a temperature below about 500° C., whereby to reduce the higher manganese oxide to manganous oxide.

12. In the process of reducing higher oxides of iron to magnetic oxide values in the presence of water vapor, the steps of maintaining a higher oxide of manganese in the iron values at all times when the temperature of the reduction process is between about 500° C. and about 850° C., and then continuing the reduction at a temperature below about 500° C. until substantially all the higher manganese oxide is reduced to manganous oxide.

13. The method of treating material containing manganese and iron values which comprises subjecting the material to the action of a reducing gas and water vapor at a reducing temperature which is not under approximately 500° C. and not over about 850° C., until an incomplete reduction is attained yielding iron values in the form of magnetic oxide, and manganese values in major part as manganous oxide, and in minor part in oxide form higher than the manganous oxide, and leaching out part of the manganous oxide with an ammonium salt solution containing dissolved ferrous iron values, whereby to recover a manganous salt solution of low iron content, and to remove dissolved iron from said leach liquor.

AGNES CORNELISON BRADLEY,
*Executrix of the Estate of Wilson Bradley.*